US005604692A

United States Patent [19]

Yuyama

[11] Patent Number: 5,604,692

[45] Date of Patent: Feb. 18, 1997

[54] METHOD OF CONTROLLING DRUG CONVEYOR SYSTEM

[76] Inventor: Shoji Yuyama, 3-8, Honan-cho Nishi 4-chome, Toyonaka-shi, Osaka, Japan

[21] Appl. No.: 367,879

[22] Filed: Jan. 3, 1995

[30] Foreign Application Priority Data

Jul. 19, 1994 [JP] Japan .................................... 6-167063

[51] Int. Cl.[6] .............................. G06F 17/00; G06G 7/48

[52] U.S. Cl. .................. 364/788; 364/479.1; 364/413.02

[58] Field of Search ..................................... 364/478, 479

[56] References Cited

U.S. PATENT DOCUMENTS 4,616,316 10/1986 Hanpeter et al. ....................... 364/479
4,847,764 7/1989 Halvorson .............................. 364/479
4,971,513 11/1990 Bergerioux et al. .................... 414/786

*Primary Examiner*—Paul P. Gordon
*Assistant Examiner*—Karen Presley
*Attorney, Agent, or Firm*—Wenderoth, Lind & Ponack

[57] ABSTRACT

A control method of efficiently transporting and collecting drugs that have been prepared in a plurality of drug processing units arranged along a conveyor line. Arranged along the conveyor line are a drug pouch printer, a powdered drug processing units, a tablet processing unit, other drug processing unit, a drug inspection unit, etc. Buckets are fed on the conveyor by numerous rollers provided on the conveyor. The drug preparation steps for respective patients are started in the order of the entry of data for the respective patients. But the buckets for the respective patients are started not in this order but the bucket for the patient whose drugs have been prepared first is started first.

4 Claims, 13 Drawing Sheets

METHOD OF CONTROLLING DRUG CONVEYOR SYSTEM

BACKGROUND OF THE INVENTION

This invention relates to a method of controlling a drug conveyor system used to collect drugs in a pharmacy with good efficiency.

In a pharmacy in a big hospital, where a large variety of drugs have to be prepared for a great number of patients, drug preparation work can be done more efficiently if different types of drugs, such as powdered drugs, tablets, liquid drugs, external application drugs, etc. are prepared separately.

In one conventional way, a single conveyor line is provided in a pharmacy. Powdered drug, tablets, etc. are packed in pouches, dropped into buckets running on the conveyor, and collected one place. Then, after checking if the drugs have been prepared as prescribed, the pouches are put in a bag and handed to a patient.

Unexamined Japanese Patent Publication No. 4-179616 discloses an improved drug preparation arrangement, in which a main conveyor and an auxiliary conveyor are used. A larger main bucket and smaller auxiliary buckets are run on the main and auxiliary conveyors, respectively. They are in their stand-by positions. Drugs prepared in the respective drug preparation stations are put in the corresponding smaller buckets and collected into the main bucket.

In the former method, in which different types of drugs are prepared and packed separately for each patient, if it takes too long a time to prepare one type of drugs for a given patient, not only the bucket for this patient but all the remaining buckets have to be stopped on the conveyor until the one type of drugs is prepared. Thus, it is impossible to process drugs in the later stage at first even if these drugs can be prepared quickly. Working efficiency is thus not high enough.

The latter method is free of this problem. But the system for carrying out this method comprises main and auxiliary conveyers and thus tends to be large in size and costly. Such a system can be used only in a big hospital.

An object of this invention is to provide an efficient, less expensive and simple method of controlling a straight or looped drug conveyor line.

SUMMARY OF THE INVENTION

In order to attain these objects, this invention provides a method of controlling a drug conveyor system comprising the steps of: entering a plurality of patient's names or codes and prescription-based drug preparation data into a logic control circuit; producing drug preparation signals necessary for each patient based on the drug preparation data, sending the drug preparation signals from the logic control circuit to one or some of a plurality of drug preparation stations which are arranged along a straight or looped conveyor line; and producing a drug preparation completion signal when all necessary drugs for a patient have been prepared in one or some of the plurality of drug preparation stations and moving one of a plurality of carrier means along said conveyor line every time said drug preparation completion signal is produced to collect all necessary drugs prepared in said one or some of said drug preparation stations.

In this method, necessary data including the patient's name and the number of the carrier means are written in a data memory attached to the carrier means when activating the carrier means, and wherein, when the drug preparation completion signal is produced at one of the drug preparation stations, necessary drugs for the patient are selected in the one of the drug preparation stations according to the data in the data memory and collected in the carrier means.

Also, the data memory may be detachable from the carrier means.

There is also provided a method as mentioned above in which a data memory means is detachably mounted on the carrier means when starting the carrier means by sending the drug preparation signal, wherein necessary data such as the code signals and prescription data are written in the data memory means at a predetermined position and at the same time indicated on a display means, and wherein, when the drug preparation completion signal is produced from one of the drug preparation stations, necessary drugs are selected in the one of the drug preparation stations according to the data in the data memory and collected in the carrier means.

According to the present invention, drug preparation instructions for a plurality of patients are sent to the respective drug processing stations in the same order as the order of entry of patients' data. But according to the time taken for preparing each type of drug, the drug preparation completion signals can be sent from the respective drug processing stations in a different order.

When all the drugs for one patient have been prepared, the carrier means corresponding to this patient is sent first, irrespective of the order of data entry. Thus, even if it takes a rather long time to prepare drugs for some patient, this will not unduly delay the drug preparation processes for subsequent patients. Also, the conveyor used for this purpose may be an extremely simple straight or looped conveyor.

According to the present invention, when starting each carrier, after a drug preparation completion signal has been received in the data memory of the carrier, the data on the corresponding patient are written in the memory. The carrier is then moved along the conveyor and stopped at the respective drug processing stations to receive necessary drugs corresponding to the data. This makes it possible to automate the conveyor line.

According to the present invention, the data memory is detachable from the carrier, so that different memories can be used in combination with different carriers. Thus, it is possible to reduce the cost.

According to the present invention, the data memory is detachable from the carrier and has a data display on which a patient's code and prescription data can be indicated. With this arrangement, since pharmacists can inspect the drugs while consulting the display, there is no need to put the corresponding prescription in each carrier for-drug inspection. Thus, the entire drug preparation process can be rationalized still further.

Other features and objects of the present invention will become apparent from the following description made with reference to the accompanying drawings, in which:

DETAILED DESCRIPTION OF THE PREFERRED EMBODIMENT

Now we will describe embodiments of the invention with reference to the drawings.

Figure 1:
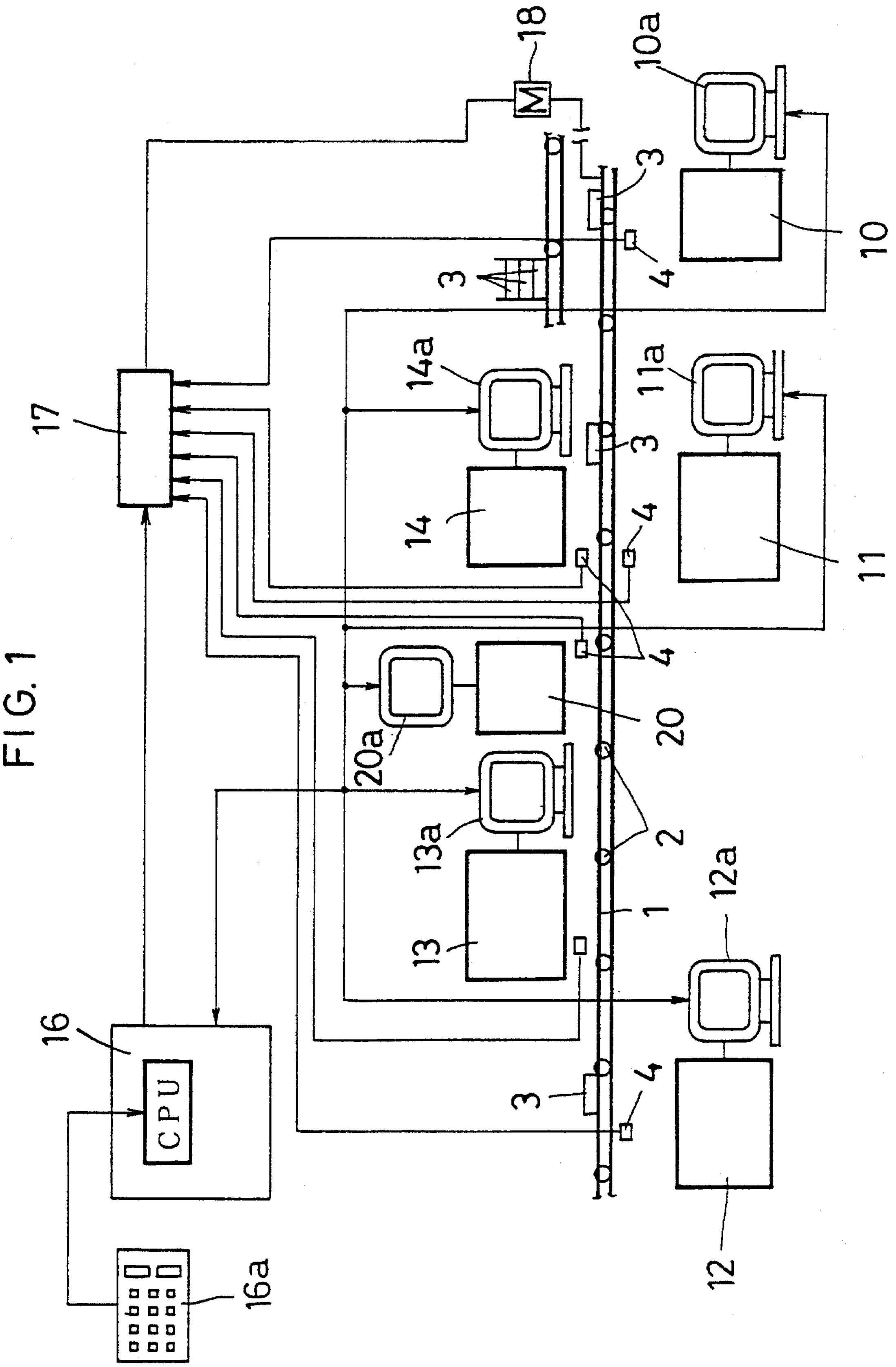
FIG. 1 is a block diagram of a control circuit of drug processing units of an embodiment.

FIG. 1 shows a block diagram of a control circuit for the conveyor lines and associated facilities of the first embodiment. In this embodiment, the conveyor line comprises a straight conveyor 1 which has many belt-driven or screw-driven rollers 2. Buckets 3 are fed forward or backward by rotating the rollers 2.

In this embodiment, the buckets 3 are driven by the rollers. But self-propelled buckets may be used. Also, the conveyor may be of any other type such as a loop conveyor.

Arranged along the conveyor line are a drug pouch printer 10 and drug preparation stations for preparing drugs, such as a powdered drug processing unit 11, a tablet processing unit 12 and a unit 13 for processing various other drugs. At the downstream end of the line is an inspection unit 14. Other processing units such as those for processing liquid drugs and external application drugs may be further provided.

These units are controlled by a control circuit which comprises a keyboard **16*a* through which patients' names or their codes are entered, a host computer 16, a sequencer 17, and personal computers 10*a*–14*a* for the respective units. A motor 18 for driving the rollers of the conveyor line is controlled by the sequencer 17. Provided immediately before the inspection unit 14 are a prescription unit 20 and a personal computer 20*a* for controlling the unit 20**.

Figure 2:
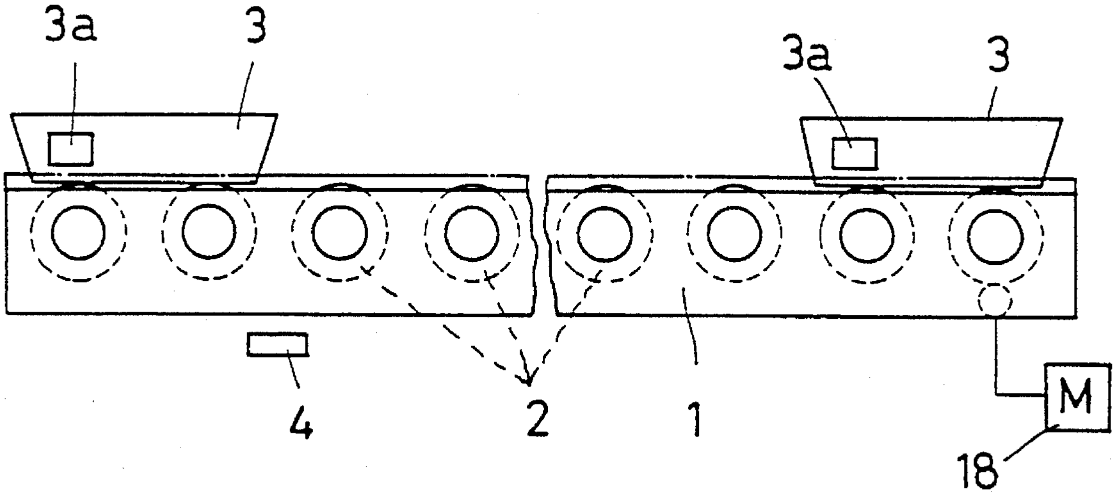
FIG. 2 is a schematic view of a conveyor of the conveyor line and a bucket thereon.
Figure 2:
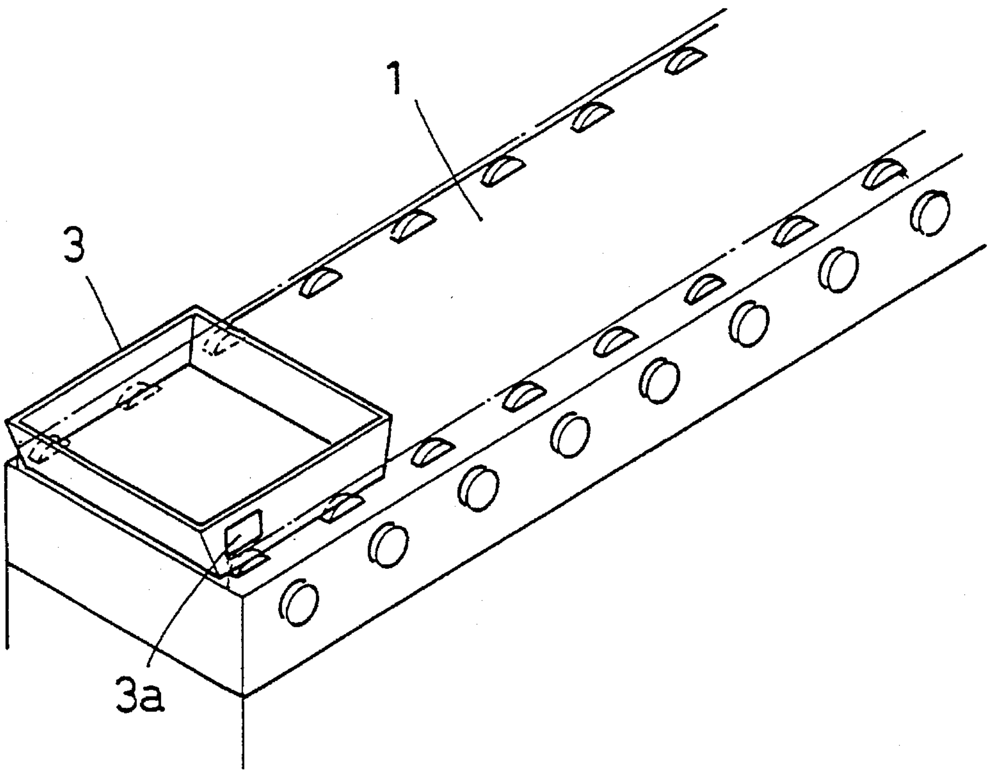

FIG. 2 and the following figures show the details of the conveyor 1, drug pouch printer 10, processing units, etc.

The conveyor 1 is a straight conveyor as mentioned earlier. The buckets 3 are of a size enough to accommodate drugs for one patient. Attached to the side of each bucket is an IDX (trade name) card **3*a*** (non-contact type IC card) for distinguishing the contents of the bucket.

The IDX card **3*a* has a read/write IC memory which can write and read out data transmitted from light signal transmitters/receivers 4** provided at suitable positions.

Figure 3:
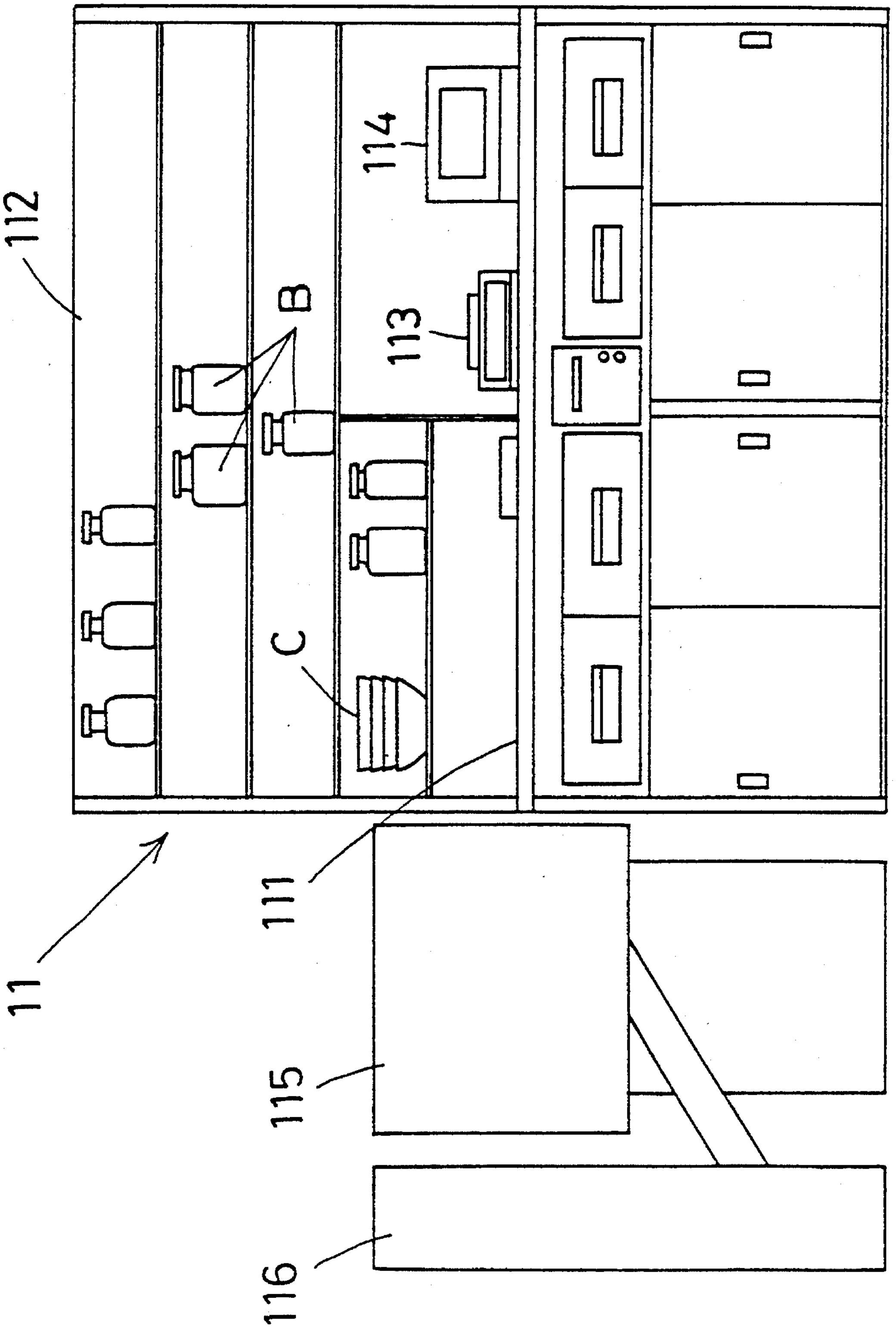
FIG. 3 is a schematic view of the powdered drug processing unit.

FIG. 3 shows the powdered drug processing unit 11. It includes a processing table 111 and a shelf 112 supported on the table 111. Placed on the table 111 are a balance 113 for weighing powdered drugs and a display 114 which indicates whether the drug on the balance is of specified kind and weight. The weighed drugs are packed in pouches by a packer 115. A predetermined number of drug pouches thus filled are bound together by a binder 116 and dropped into the bucket 3 running on the conveyor.

The binder 116 takes up a predetermined length of drug pouches and binds them together with a band. The binder 116 has a storage unit for storing drug pouches for a plurality of patients. Such storage unit is necessary because drug pouches are not dropped into buckets according to the order of input data transmitted from the host computer but instead, the drug pouches for a given patient that have been prepared first are dropped into a bucket first. Signals that indicate the completion of drug preparation are produced automatically.

The binder 116 may be omitted. If omitted, it is necessary to provide a storage unit for storing the drug pouches packed by the packer 115. This storage unit is similar to a storage shelf of the drug processing unit 13.

The storage shelf comprises a plurality of shelves arranged one over another. A short conveyor is provided on each shelf. A display and a press switch are provided on one side of an opening of each shelf. Drug pouches for each patient are stored on the shelf whose display indicates the patient's name or code. When all the drugs have been stored on the corresponding shelf, its press switch is pressed manually to transmit a signal which indicates that drug preparation for this patient has been completed.

The processing unit 11 is controlled by the personal computer **11*a***.

Figure 4:
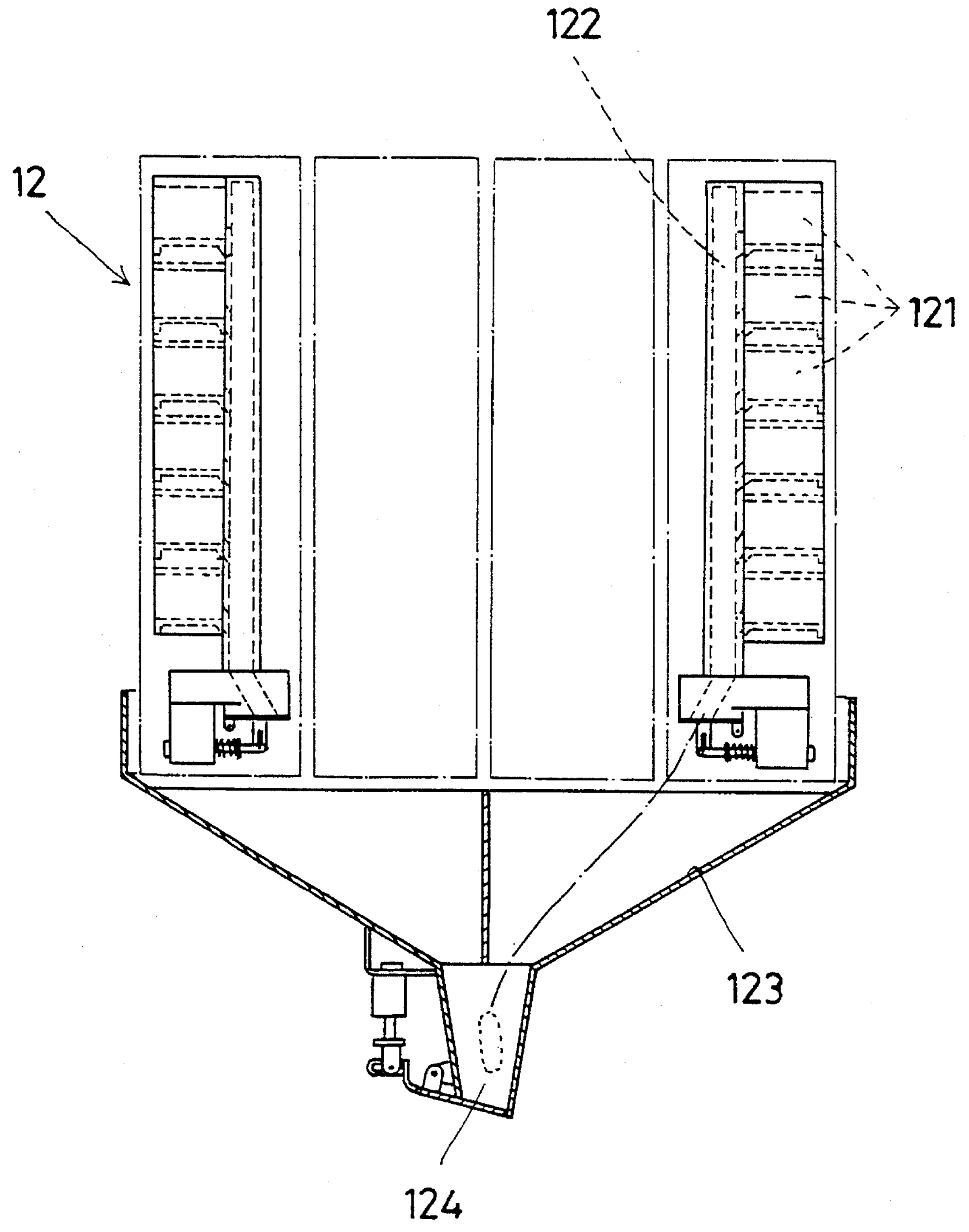
FIG. 4 is a schematic view of the tablet processing unit.

FIG. 4 shows the tablet processing unit 12. Tablets are fed from tablet feeders 121, dropped through an upright passage 122 to a hopper 123, and discharged from an outlet 124 provided at the bottom end of the hopper 123. A predetermined number of tablets are then packed in pouches, which are fed into a bucket running on the conveyor 1.

Though not shown, a motor is mounted on the bottom of each tablet feeder 121. The personal computer **12*a* sends signals to required ones of the motors to drive them and feed selected tablets. All the steps carried out in the unit 12 are controlled by the personal computer 12*a***.

Similar to the powdered drug processing unit, the unit 12 also has a drug packer and a binder. After packing tablets in pouches, a predetermined length of pouches are bound into one. After binding, a drug preparation completion signal is transmitted automatically. If the binder is not used, a drug storage space is provided. Every time packed tablets are stored in the storage space, a press switch is pressed to transmit a drug preparation completion signal.

Figure 5B:
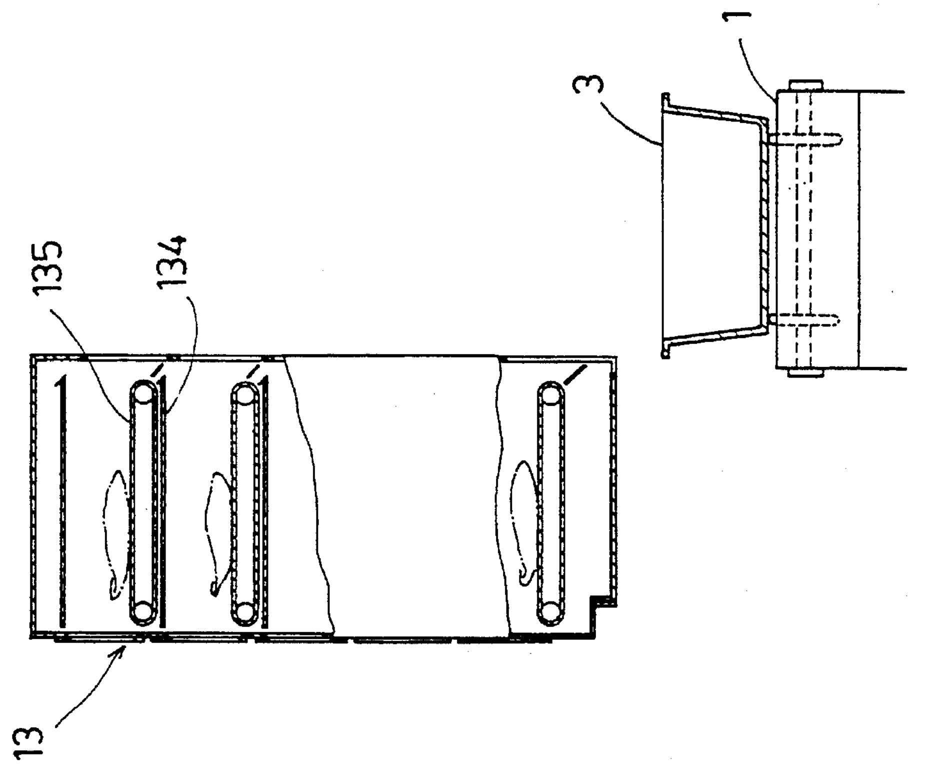
FIGS. 5A and 5B are schematic views of the other drug processing unit.
Figure 5A:
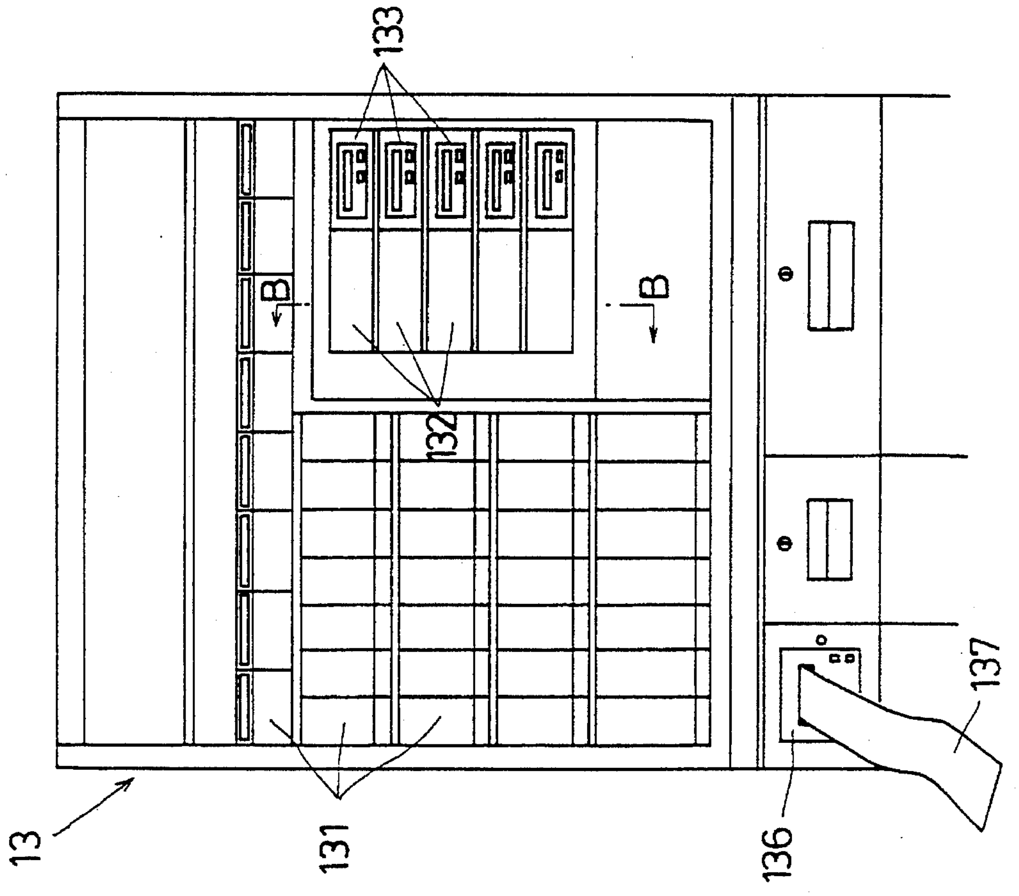

FIGS. 5A and 5B are a perspective view and a sectional view taken along arrow B—B (of FIG. 5A) of the unit 13 for processing various other drugs. This processing unit 13 is mainly used to prepare PTP-packed tablets but may be used to prepare tablets or any other kind of drugs. Tablets are stored on shelves 131. Necessary kinds of tablets are taken out by necessary numbers and placed, as is or in a packed state, in a storage space through an opening 132. Each shelf 134 has a display 133 which indicates a patient's code. Tablets are stored on the respective shelves 134 according to the patients' names or codes indicated on the displays 133.

When a bucket 3 on the conveyor line, which runs behind the processing unit 13, passes the unit 13, a small conveyor 135 of the shelf 134 corresponding to the bucket 3 is activated. The drug pouch on the conveyor is thus dropped into the bucket 3.

Figure 6B:
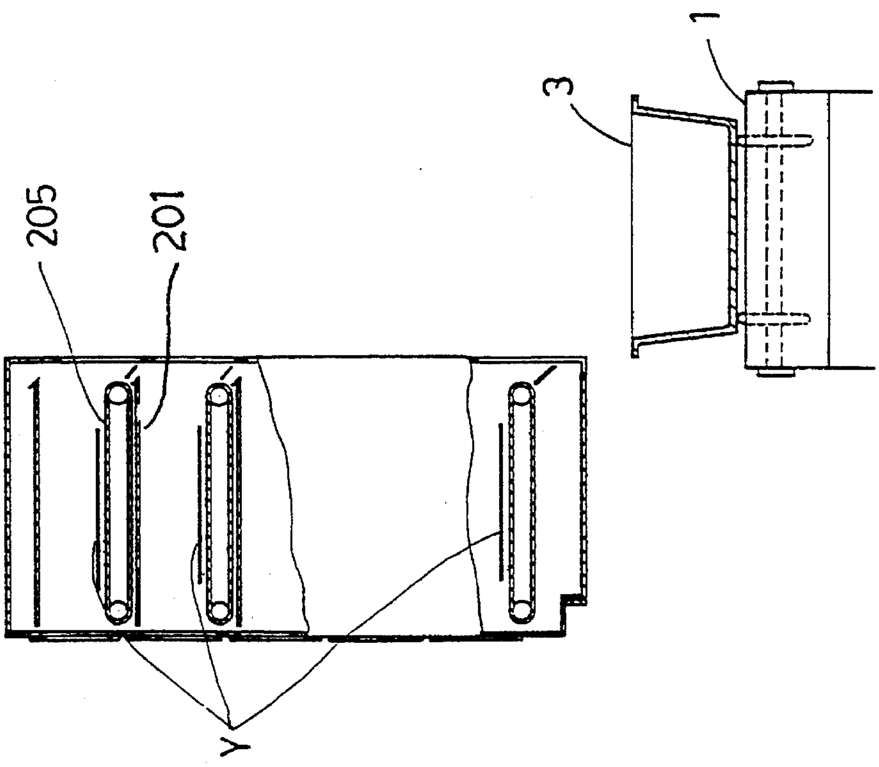
FIGS. 6A and 6B are schematic views of the prescription unit.
Figure 6A:
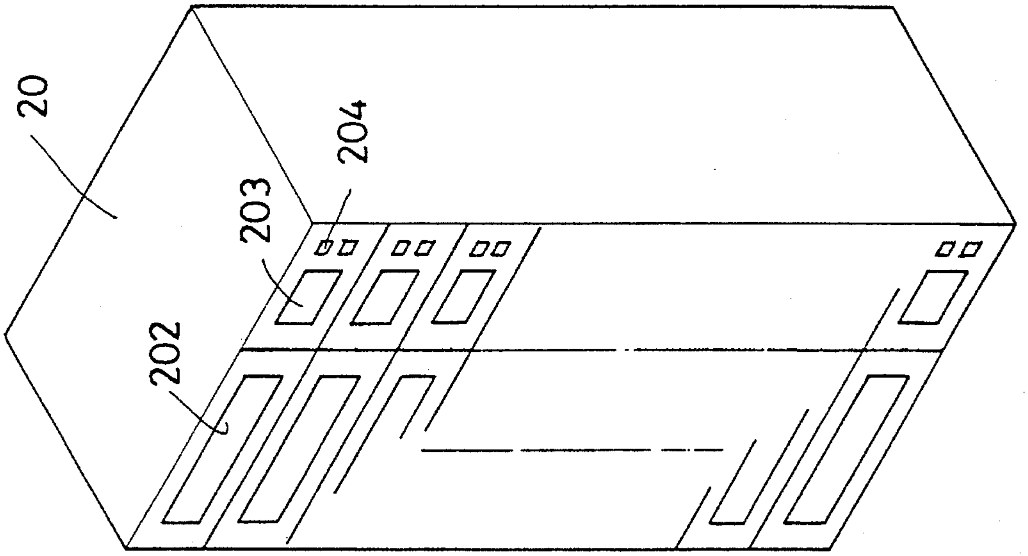

FIG. 6 shows the prescription unit 20. It is similar in structure to the drug storage shelves of the drug processing unit 13. It has shelves 201, openings 202, displays 203, press switches 204 and small conveyors 205. Y indicates prescriptions. This unit is operated in the same way as the storage shelf of the powdered drug processing unit.

Figure 7:
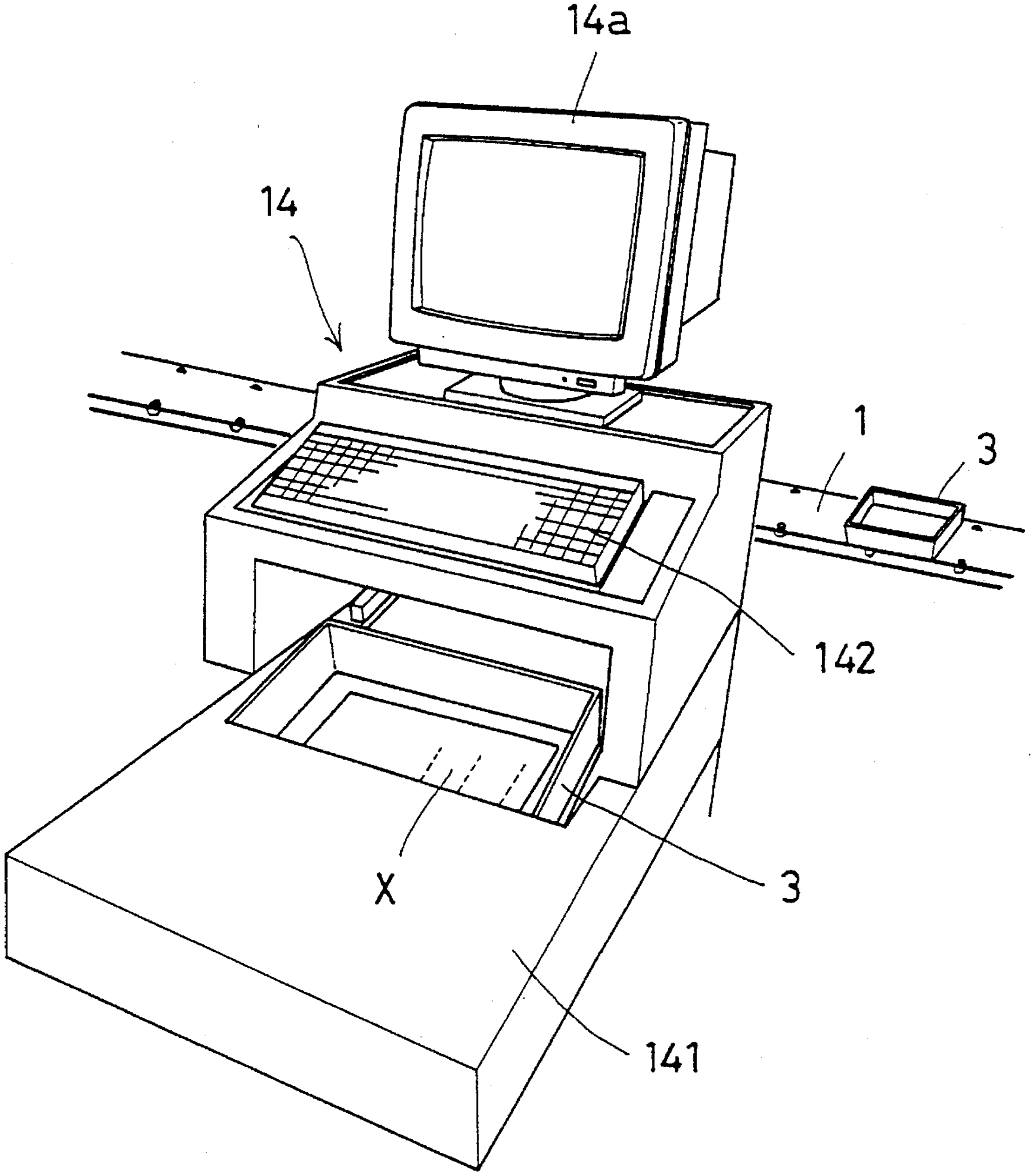
FIG. 7 is a schematic view of the inspection unit.

FIG. 7 shows the inspection unit 14. When all the drugs for one patient are put in the corresponding bucket 3, the bucket is removed from the conveyor 1 onto an inspection table 141. In this state, an operator can check if the bucket contains all the drugs specified in the prescription by operating a keyboard 142 and the personal computer 14*a*.

If the bucket contains all the specified drugs, they are packed in a pouch X which is also put in the bucket 3. Now, the drug pouch is ready to be handed to the patient.

Figure 8:
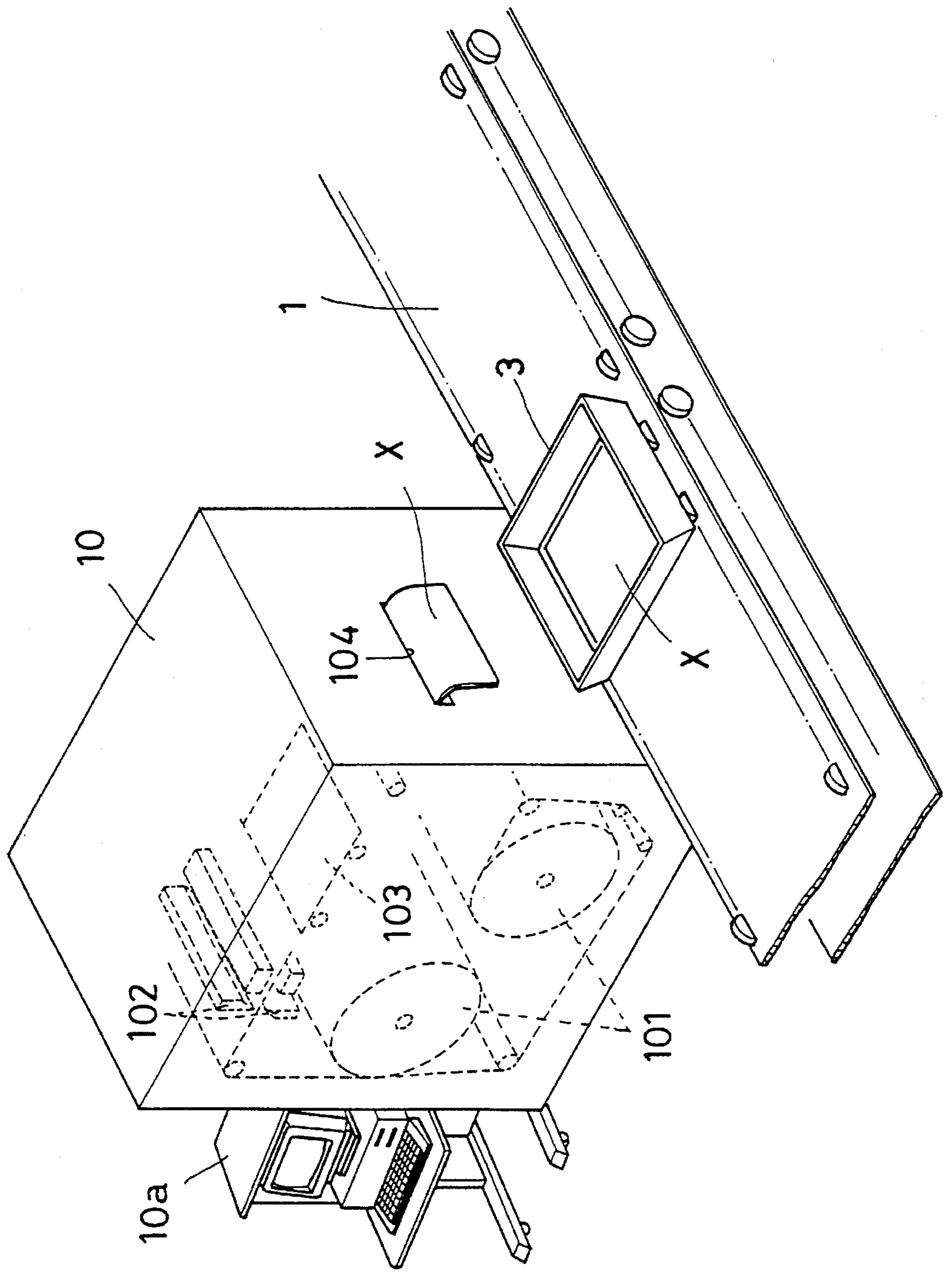
FIG. 8 is a schematic view of the drug pouch printer.

FIG. 8 shows the drug pouch printer 10. A roll of paper 101 is stored in the printer 10. The paper is pulled out and cut to a predetermined length by a cutter 102. The sheet thus cut are formed into a pouch by bonding its corners. Patient's name, drug types, and directions are printed on the front of the pouch by the printer 10. The printed pouch is discharged through an outlet 104 and put into the bucket 3.

In the embodiment, the printer 10 is provided near the upstream end of the conveyor line but may be provided at a different location. For example, it may be provided parallel to the inspection unit 14.

Now we will describe the operation of the control circuit for the processing units in this embodiment.

Before starting the drug processing with the processing units, data on patients are entered into the host computer 16 through the keyboard 16*a*. Such data include patients' ID codes, prescription numbers, exchange tag numbers, and data codes about taking amounts and directions of the drugs specified in the prescriptions.

When necessary data are entered into the host computer 16, the host computer 16 sends operation signals to the respective personal computers to activate the processing units. For example, the powdered drug processing unit 11 begins preparing powdered drugs. In the illustrated embodiment, the display 114 indicates the kind of powdered drug to be prepared in codes and its amount.

An operator takes a bottle B that contains a drug indicated on the display 114 out of the shelf 112. When the bottle B is removed from the shelf, a signal is transmitted from the bottle to a receiver (not shown). The personal computer 11*a* checks the signal and indicates if the bottle is a right one containing the right drug. If it is the right drug, a predetermined amount of drug in the bottle is poured into a bowl C and weighed on the balance 113. Its weight is indicated on the display 114. Thus, its weight is finely adjustable by adding or taking a given amount of drug.

Once the right drug is weighed by a right amount, it is packed in separate pouches by the packer 115 according to the directions and amounts. A plurality of such pouches, which are connected together like a web, are stacked one on another and bound together. This completes all the steps at the powdered drug processing unit and a signal to this effect is transmitted from the personal computer 11*a* to the host computer 16.

The steps in the tablet processing unit 12 are basically the same as the steps in the unit 11. Namely, tablets for each patient are selected by sending a driving signal to a corresponding motor from the host computer 16. By driving the motor for the selected tablet feeder 121, a predetermined number of the selected tablets are discharged from the feeder. The tablets are then dropped through the upright passage 122 and collected to the outlet 124. Then they are sent to the packer where they are packed in a web of pouches. The pouches are stacked and bound together. This completes the steps in the tablet processing unit and a signal to this effect is transmitted from the personal computer 12*a* to the host computer 16.

The steps in the drug processing unit 13 are also substantially the same as the steps in the above units. In this unit, necessary kinds of drugs are indicated on the display of the personal computer 13*a*. The drugs indicated on the display are taken out of the shelf 131 and placed in the storage shelf through the opening 132 near the display 133 indicating the corresponding patient's code. By pressing the press switch at the side of the display 133, the steps for this unit is completed. A signal to this effect is thus transmitted from the personal computer 13*a* to the host computer 16. Numeral 136 indicates a printer for printing drug preparation instructions 137.

In the embodiment, the pouch printer 10 is provided near the upstream end of the conveyor line. But it may be provided near the inspection unit 14. In the embodiment shown, drug pouches are prepared after the signals indicative of the completion of steps in all the processing units have been produced. The drug-containing pouches are printed and dropped into the corresponding bucket 3. Once all the pouches are dropped into the bucket, necessary data such as the patient's name and bucket number are written into the IDX card of the bucket 3 by the light signal transmitter/receiver 4. If the pouch printer 10 is provided near the inspection unit 14, printing on pouches may be started when the bucket 3 approaches the inspection unit 14.

When all the drug processing steps are done and all the completion signals are issued, the bucket 3 is moved ahead (the bucket 3 is kept stand-by at the upstream end of the conveyor 1 until all the completion signals are issued). When all the drugs have been put in the bucket, the host computer 16 transmits a driving signal to the sequencer 17 to feed the conveyor 1 and thus the bucket thereon by driving the motor 18.

When the bucket 3 begins to move and approaches the powdered drug processing unit 11, the light signal transmitter/receiver 4 receives the signal indicative of the data from the IDX card attached to the side of the bucket 3, such as the bucket number and patient's name. It sends the data on the patient's name to the host computer 16 through the sequencer 17. If the host computer judges that necessary steps for the patient have been completed, it will transmit a signal to the sequencer 17 to stop the bucket 3 at a predetermined position in the powdered drug processing unit 11 by stopping the motor 18. The powdered drugs for the patient will be dropped into the bucket 3.

Similarly, checking is made if the drugs specified in the prescription have been prepared in the tablet processing unit 12 and the other drug processing unit 13. If judged that all the drugs for the corresponding patient have been prepared, they will be dropped from the respective processing units into the bucket.

When all the drugs prepared in all the processing units have been collected in the bucket 3, the bucket 3 will be sent through the prescription unit 20 to the inspection unit 14. The order of collecting the drugs from the respective drug processing units is not limited, provided that all of the specified drugs are collected into the bucket without fail.

The prescription unit 20 is located immediately before the inspection unit 14. When the bucket 3 passes the prescription unit 20 and the light signal transmitter/receiver 4 detects the bucket 3, the prescription for the corresponding patient will be put in the bucket 3.

When the bucket 3 passes the inspection unit 14, the bucket 3 is pulled onto the inspection table 141 of the inspection unit 14. The latter will check if the data shown on the personal computer 14*a* coincides with the data on the prescription in the bucket and if all the drugs specified are contained in the bucket. If judgment is made that the bucket contains all the right drugs, the drugs are packed in a pouch X in the bucket and handed to the corresponding patient. In this way, drugs for each patient are automatically collected. If data for a plurality of patients are entered at a time, the abovementioned drug preparation process is carried out in the following manner.

Figure 9:
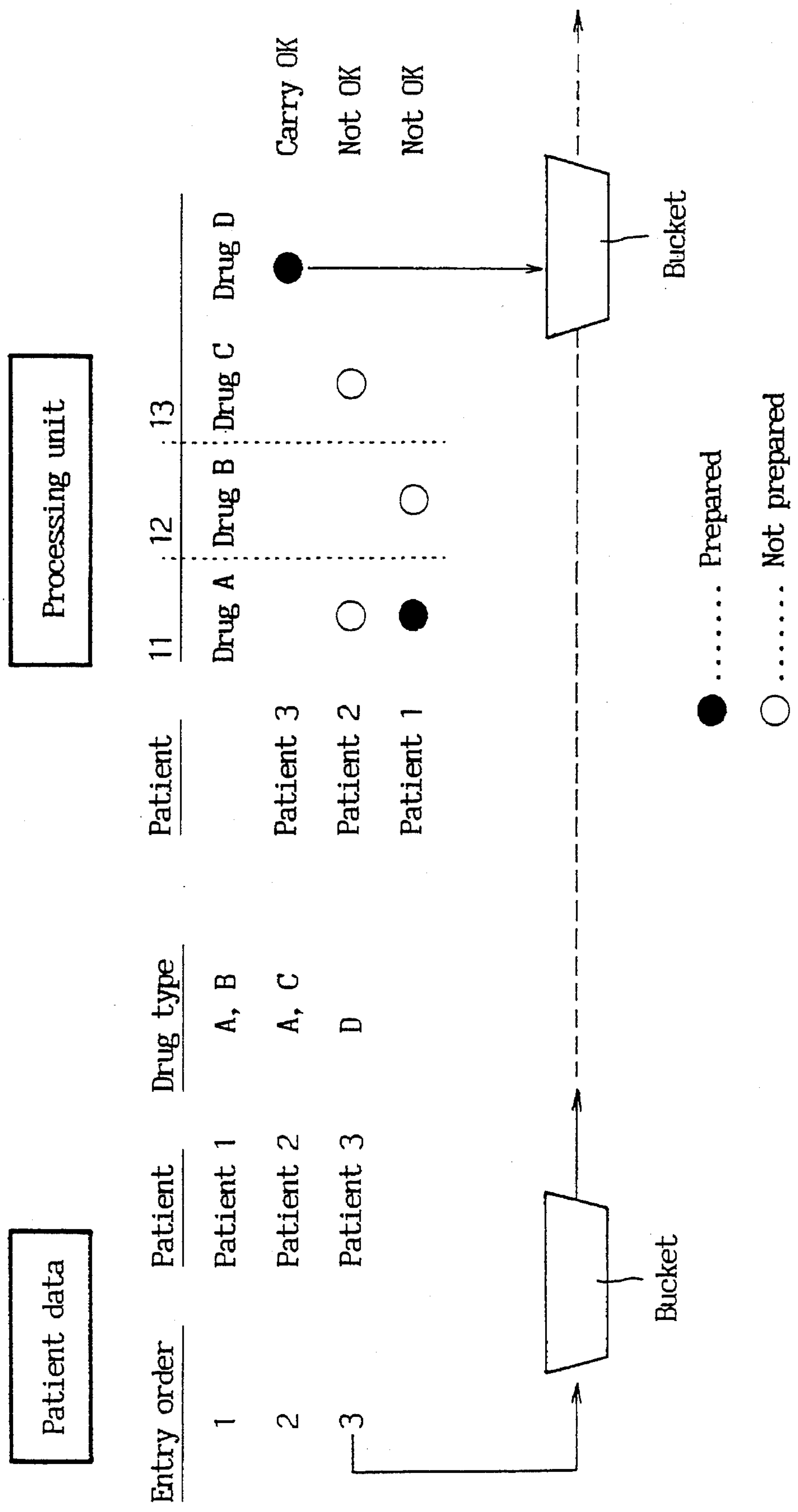
FIG. 9 is a view explaining the drug processing sequence for a plurality of patients.

FIG. 9 shows the sequence of operation when data for three patients are entered at one time. Suppose data for three patients 1, 2 and 3 are entered in this order. Operation signals are thus sent to the processing units 11, 12 and 13 in this order. But the drug preparation process may not necessarily end in this order. Symbols ● in the figure indicate that the drug preparation is complete, while ○ indicate that it is not.

Suppose preparation for the drugs for patient 3 is complete, while the drugs for patients 1 and 2 are not yet prepared, as shown in the figure. In this case, the bucket for patient 3 is moved first to collect drug D in spite of the fact that the data for patient 3 have been entered last. Then, when preparation for the drugs for one of the patients 1 and 2 is complete, the corresponding bucket is moved (while one bucket is on the conveyor line, no subsequent bucket will ever be moved).

When all the drugs for any one patient have been prepared, the bucket corresponding to the particular patient is moved. No subsequent buckets are moved until the first bucket is pulled into the inspection unit 14. Thus, drugs can be prepared and transported efficiently and smoothly.

The above operation sequence is a mere example. Various modifications are possible. For example, the program may be so adapted that the bucket for patient 1 or 2 is started as soon as the drug preparation for this patient is finished even if the bucket for patient 3 is still on the conveyor line. With this arrangement, it is possible to further improve the efficiency of transportation and shorten the waiting time.

In the above embodiment, the conveyor line is a straight conveyor. If a loop conveyor is used in place of the straight one, the processing units are arranged along the loop conveyor preferably in the same order as described in the embodiment. But they may be arranged in different orders.

The storage shelves shown above are also mere examples. It is of course possible to use different type of shelves having different structures.

In the above embodiment, each bucket carries an IDX card. Various data such as a patient's name and a bucket number are written into the IDX card by the light signal transmitter/receiver provided near the upstream end of the conveyor. But such an IDX card may be omitted. If omitted, the entire apparatus is controlled as follows:

As mentioned earlier, all the data on patients are stored in the host computer 16, which gives drug preparation instructions to the respective processing units. In response, the personal computers of the processing units display data on drugs. The drugs shown on the personal computers are prepared in the respective processing units. When drugs have been prepared, signals to this effect are sent from the respective processing units to the host computer 16. When all the drugs for one patient have been prepared, the host computer 16 sends a signal to this effect to the sequencer 17, which, in response, activates the motor 18 and thus the conveyor 1.

Data on which buckets to receive drugs from which processing units are stored in the host computer 16. Thus, even if buckets carry no IDX cards, it is possible to stop each bucket at desired processing units to collect right drugs therein.

In the embodiment, the IDX card 3*a* is undetachably fixed to the side of each bucket 3 though this is not apparent from the figures. But the IDX card 3*a* may be detachably mounted to the bucket. For example, it may be inserted in a frame fixed to the side of the bucket 3.

Figure 10:
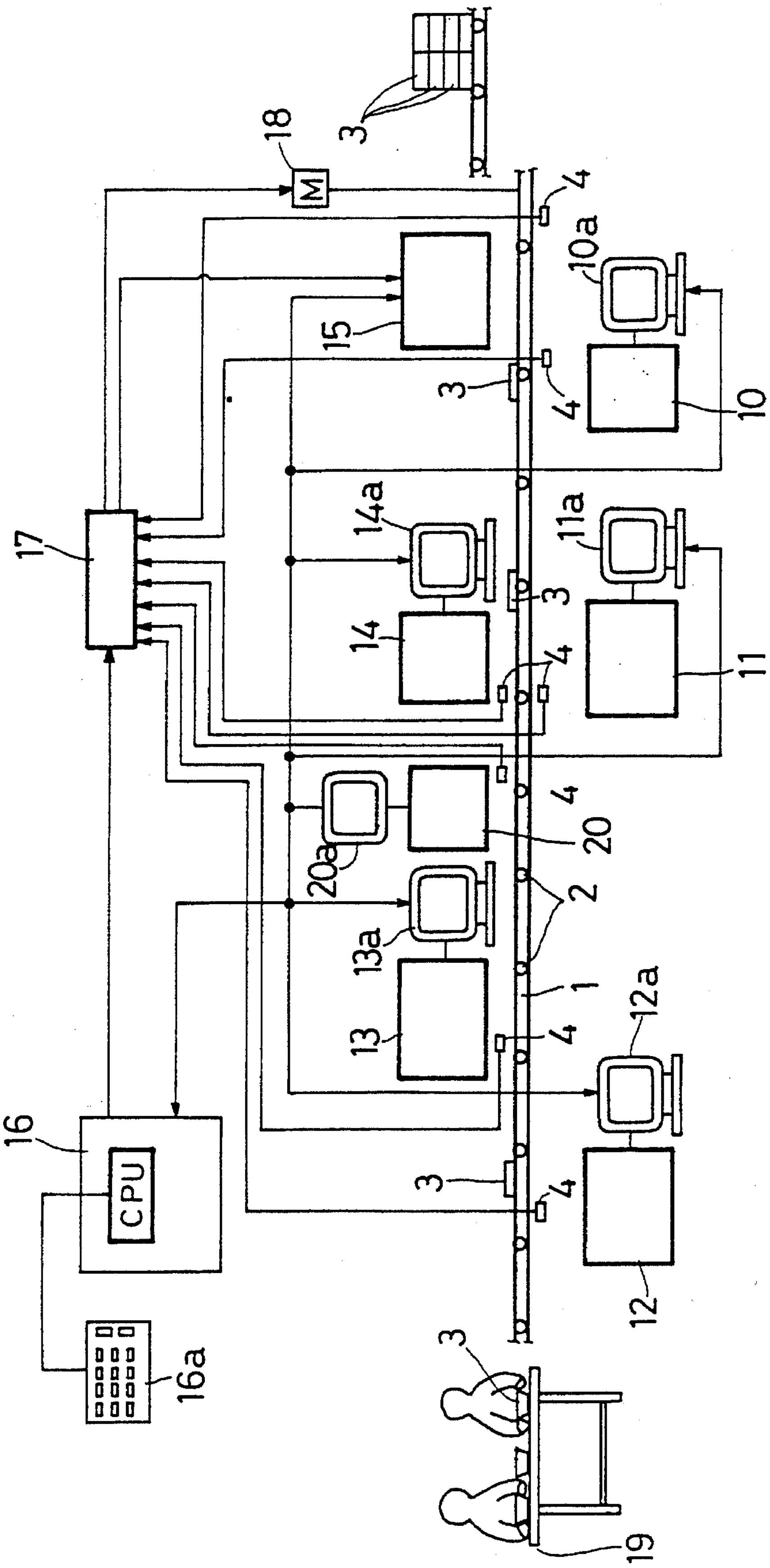
FIG. 10 is a block diagram of a control circuit of another embodiment, similar to FIG. 1.

FIG. 10 shows a block diagram of a conveyor control circuit of another embodiment. In this embodiment, an ID dispensing unit 15 is provided near the starting point of the conveyor. An ID indicator 3*b* supplied from the unit 15 is detachably mounted on each bucket 3. The drugs in the bucket are inspected on a drug inspection table 19 using the ID indicator 3*b*. Otherwise, this embodiment is the same as in the first embodiment. Thus, we denote the same members as the first embodiment by the same numerals and omit their description.

Figure 11A:
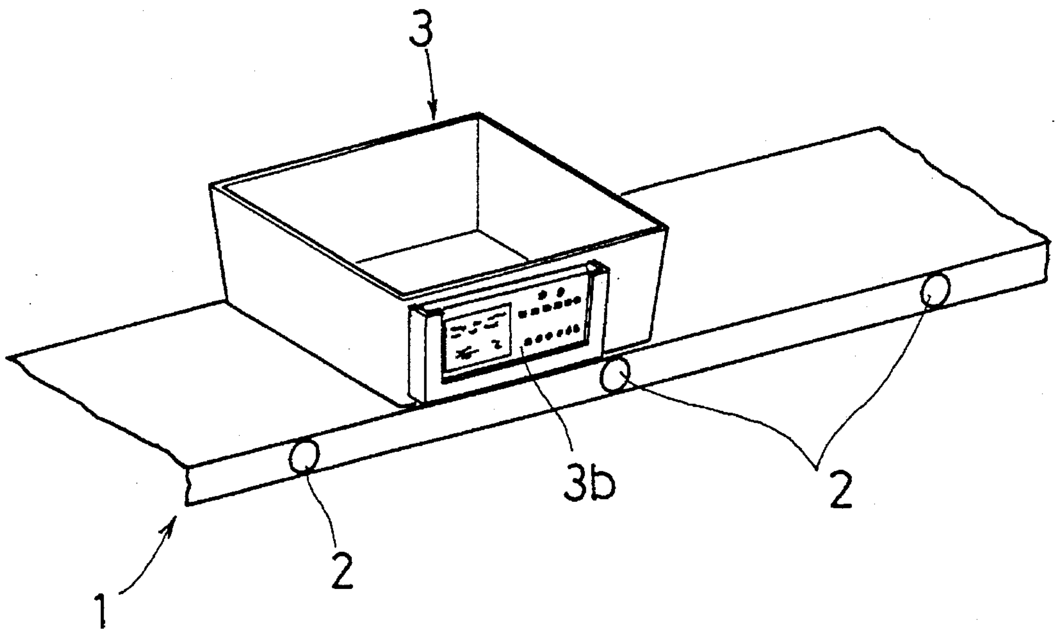
FIGS. 11A and 11B are outer perspective views of an ID display attached to each bucket.
Figure 11B:
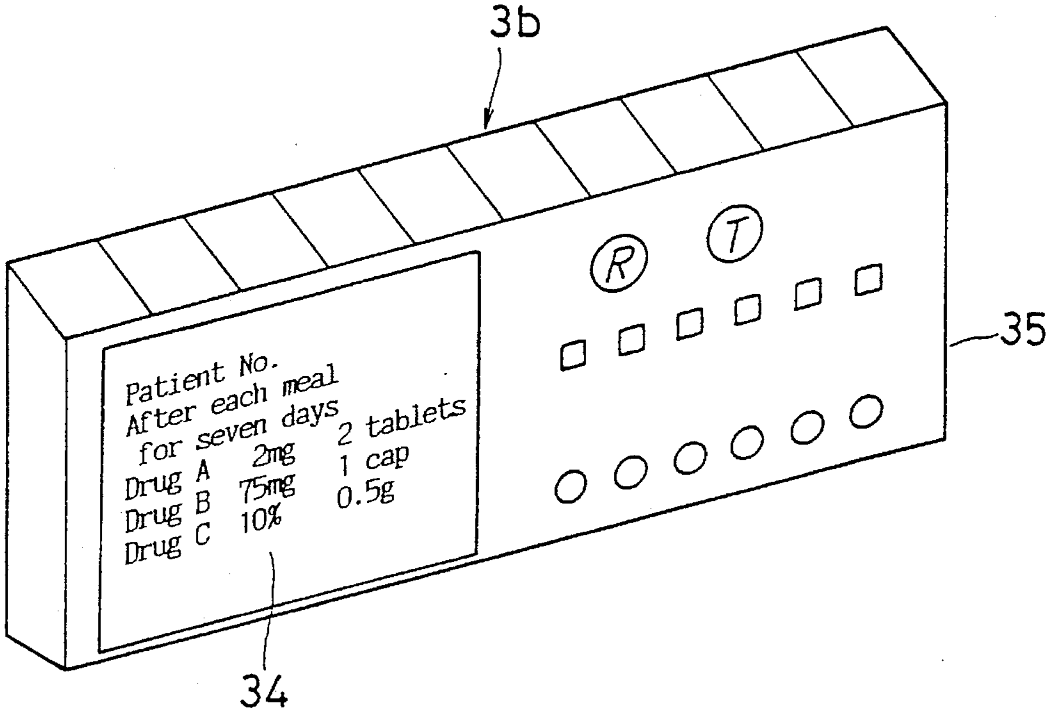

As shown in FIG. 11A, in this embodiment, instead of the IDX card 3*a* used in the first embodiment, the ID indicator 3*b* is detachably inserted in a frame fixed to each bucket 3. FIG. 11B is a perspective view of the ID indicator 3*b*.

Figure 12:
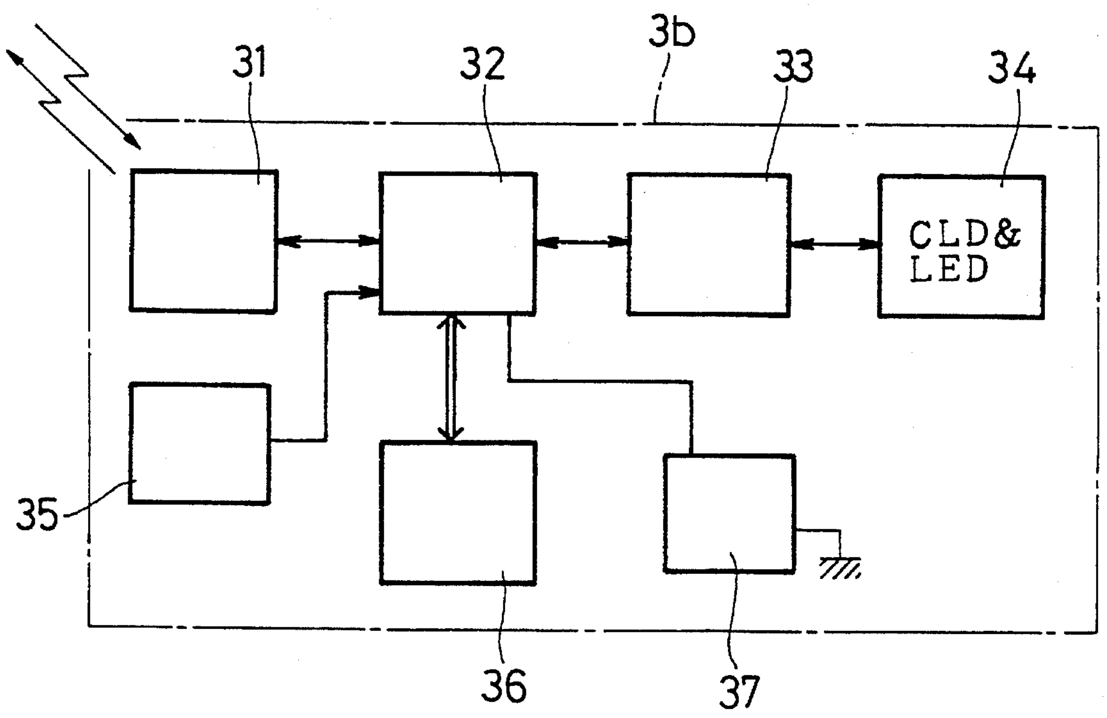
FIG. 12 is a schematic block diagram of the ID display.

As shown in FIG. 12, the ID indicator 3*b* has a data storage memory 36. When external data are written in the memory 36 through a signal transmitter/receiver 31, a control unit 32 activates a display driver 33 to indicate these data on a display (CLD or LED) 34. Numeral 35 indicates a key input. Element 37 is a power source.

The signal transmitter/receiver 31 is an optical communication type transmitter/receiver that utilizes laser or infrared beams. If infrared beams are used, the IDX card may be provided integrally on the display.

The data written in the signal transmitter/receiver 31 includes data written on prescriptions as well as patients' codes and bucket numbers. These data are indicated on the display 34.

Figure 13A:
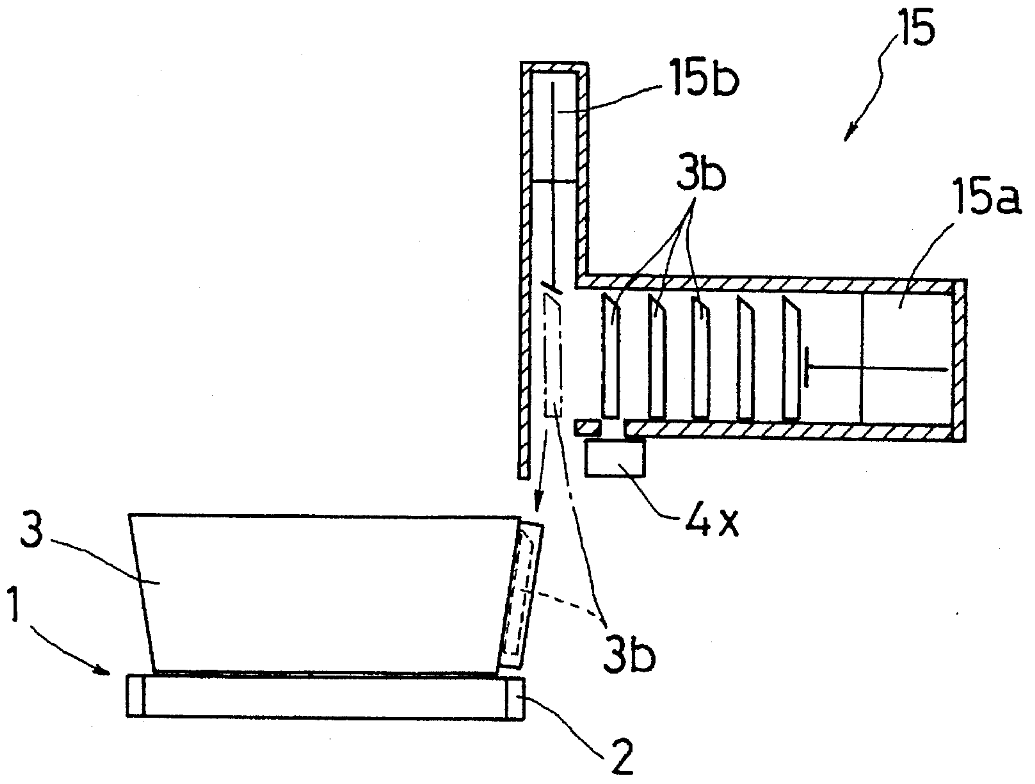
FIGS. 13A and 13B are schematic views of an ID dispensing unit.

As shown in FIG. 13A, the ID dispensing unit 15 comprises two driving members 15*a* and 15*b*. A data transmitter 4x is mounted on the driving member 15*a*. A plurality of ID indicators 3*b* are mounted in the driving member 15*a*. One indicator 3*b* is allotted for one patient. After writing the data for one patient at the data transmitter 4x, one indicator is pushed out by the driving member 15*a*, and lowered while suspended from the driving member 15*b* until inserted in a frame fixed to the side of the corresponding bucket 3.

Figure 13B:
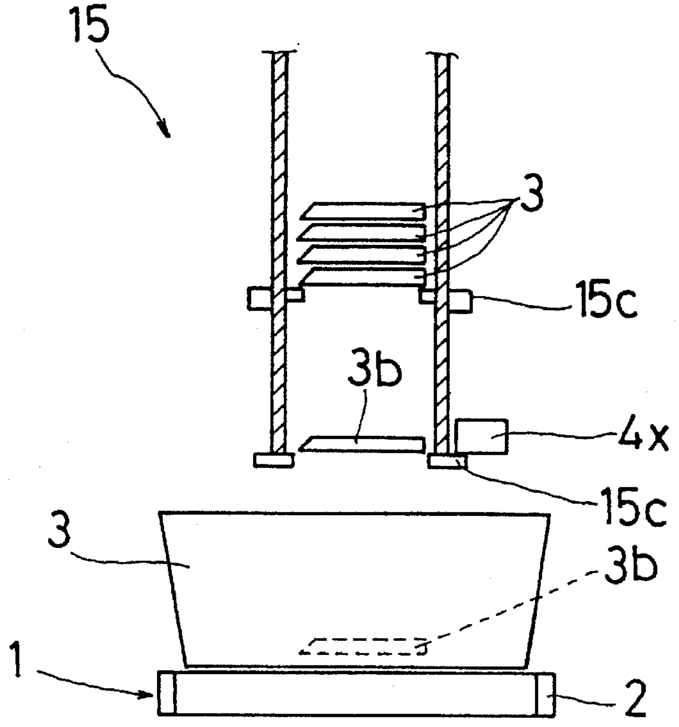

FIG. 13A shows an optical communication type, while FIG. 13B shows an electric wave type. In FIG. 13B, the ID dispensing unit 15 is provided right over a bucket 3 which is placed at the starting point of the conveyor line. The ID dispensing unit 15 of a suspension frame type, has an upper stopper 15*c* for supporting a plurality of ID indicators 3*b*, and a lower stopper 15*c* for supporting the indicators 3*b* one at a time. Necessary data are written in each ID indicator 3*b* by the data transmitter 4x when it is supported on the lower stopper 15*c*. The indicator 3*b* is then inserted in the bucket 3. The upper and lower stoppers are spaced apart a predetermined distance from each other to prevent any harmful influence on the ID indicators supported on the upper stoppers while writing data in the ID indicator supported on the lower stopper.

The drug inspection table 19 shown in FIG. 1 is a simple table. The drugs prepared in the respective processing units are placed on the table 19 to check if they have been prepared as directed by the prescriptions. In operation, the second embodiment differs from the first embodiment only at the starting step and the drug inspection step. We will therefore discuss mainly what is different from the first embodiment.

In this embodiment, unlike the first embodiment, patient's code number, bucket number and patient's prescription data are indicated on the indicator **3*b* attached to the side of each bucket 3 (in the first embodiment, such data are stored in the IDX card but not shown on a display). Thus, no prescription nor instruction sheet is put in buckets 3 (in the first embodiment, it has to be put in each bucket 3). Buckets used in this embodiment may be of any type or shape provided ID indicators 3*b*** are attachable.

An ID indicator **3*b* is attached to each bucket 3 by the ID dispensing unit 15 at the starting point in the manner shown in FIGS. 13. When patient's code and prescription data are transmitted from the data transmitter 4x and a drug preparation completion signal is received from the host computer 16, the bucket 3** will be started.

When the bucket 3 reaches each of the processing units for preparing the necessary drugs for the patient corresponding to the bucket 3, the light signal transmitter 4 reads the data on the ID indicator **3*b* attached to the bucket 3. Then, the drugs prepared according to the instructions of the host computer 16 are put into the bucket 3**.

When all the drugs are put in the bucket 3, it will be moved onto the drug inspection table. In this state, prescription data such as shown in FIG. 11B are indicated on the display 34 of the ID indicator **3*b***.

Thus, drug inspection is complete simply by checking if the drugs as indicated on the display are actually put in the bucket. There is no need to put the actual prescription in the bucket.

What is claimed is:

1. A method of controlling a drug conveyor system comprising the steps of:

entering a plurality of patients' names or codes and respective prescription-based drug preparation data into a logic control circuit;

producing a plurality of drug preparation signals respectively indicative of a plurality of different prescription orders for said plurality of patients based on said drug preparation data;

sending each of said plurality of drug preparation signals from said logic control circuit to a plurality of drug preparation stations which are arranged along a straight or looped conveyor line and which are for preparing simultaneously the different prescription orders; and producing a drug preparation completion signal each time a corresponding prescription order for a patient has been completely prepared in at least one of said plurality of drug preparation stations; and moving one of a plurality of carrier means along said conveyor line every time said drug preparation completion signal is produced to collect the corresponding prescription order prepared in said at least one of said plurality of drug preparation stations, wherein an order of collection of said plurality of different prescription orders by said plurality of carrier means is the same as an order of complete preparation of said plurality of prescription orders by said plurality of drug preparation stations.

2. A method as claimed in claim 1, wherein necessary data including the patient's name and the number of said carrier means are written in a data memory attached to said carrier means when activating said carrier means, and wherein, when said drug preparation completion signal is produced at one of said drug preparation stations, necessary drugs for the patient are selected in said one of said drug preparation stations according to said data in said data memory and collected in said carrier means.

3. A method as claimed in claim 2, wherein said data memory is detachable from said carrier means.

4. A method as claimed in claim 1, wherein a data memory means is detachably mounted on said carrier means when starting said carrier means by sending said drug preparation signal, and wherein necessary data including said code signals and prescription data are written in said data memory means at a predetermined position and at the same time indicated on a display means, and wherein, when said drug preparation completion signal is produced from one of said drug preparation stations, necessary drugs are selected in said one of said drug preparation stations according to said data in said data memory and collected in said carrier means.

* * * * *